(12) United States Patent
Iyigun et al.

(10) Patent No.: US 10,372,494 B2
(45) Date of Patent: Aug. 6, 2019

(54) THREAD IMPORTANCE BASED PROCESSOR CORE PARTITIONING

(71) Applicant: Microsoft Technology Licensing, LLC, Redmond, WA (US)

(72) Inventors: Mehmet Iyigun, Kirkland, WA (US); Kai-Lun Hsu, Kirkland, WA (US); Tristan A. Brown, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 250 days.

(21) Appl. No.: 15/439,684

(22) Filed: Feb. 22, 2017

(65) Prior Publication Data

US 2018/0129534 A1 May 10, 2018

Related U.S. Application Data

(60) Provisional application No. 62/417,837, filed on Nov. 4, 2016.

(51) Int. Cl.
*G06F 9/46* (2006.01)
*G06F 9/48* (2006.01)
(Continued)

(52) U.S. Cl.
CPC .............. *G06F 9/4881* (2013.01); *G06F 1/08* (2013.01); *G06F 1/324* (2013.01); *G06F 1/329* (2013.01);
(Continued)

(58) Field of Classification Search
None
See application file for complete search history.

(56) References Cited

U.S. PATENT DOCUMENTS 7,711,966 B2   5/2010   Prabhakaran et al.
8,010,822 B2   8/2011   Marshall et al.
(Continued)

FOREIGN PATENT DOCUMENTS

EP   2851796         3/2015
WO   2008022882 A1   2/2008
(Continued)

OTHER PUBLICATIONS

"International Search Report and Written Opinion", Application No. PCT/US2017/058384, dated Feb. 9, 2018, 16 pages.
(Continued)

*Primary Examiner* — Wissam Rashid

(57) ABSTRACT

Each processor core in a device supports various different frequency ranges and/or energy performance preferences, and can operate to run threads at any one of those different frequency ranges and/or energy performance preferences. Processor cores are partitioned into different groups, each group running at different frequency ranges and/or energy performance preferences. Threads in the device are assigned one of multiple importance levels and scheduled to run on a processor core in a particular group based on the importance level of the thread. Lower importance level threads are scheduled to run in a group that is more power efficient, and higher importance level threads are scheduled to run in a group that is higher performance. The group that a processor core is part of can change during operation of the device based on the needs of the device and/or applications running on the device.

15 Claims, 6 Drawing Sheets

(51) Int. Cl.
*G06F 1/08* (2006.01)
*G06F 9/50* (2006.01)
*G06F 1/324* (2019.01)
*G06F 1/3234* (2019.01)
*G06F 1/329* (2019.01)

(52) U.S. Cl.
CPC .......... *G06F 1/3243* (2013.01); *G06F 9/5038* (2013.01); *G06F 9/5077* (2013.01); *G06F 9/5094* (2013.01); *Y02D 10/126* (2018.01); *Y02D 10/152* (2018.01); *Y02D 10/22* (2018.01); *Y02D 10/24* (2018.01)

(56) References Cited

U.S. PATENT DOCUMENTS

| | | |
|---|---|---|
| 9,086,823 B2 | 7/2015 | Werner |
| 9,377,842 B2 | 6/2016 | Koo et al. |
| 2004/0215987 A1 | 10/2004 | Farkas et al. |
| 2006/0123251 A1* | 6/2006 | Nakajima ............ G06F 1/3203 713/300 |
| 2006/0282692 A1 | 12/2006 | Oh |
| 2006/0294401 A1 | 12/2006 | Munger |
| 2008/0127192 A1 | 5/2008 | Capps et al. |
| 2008/0134191 A1 | 6/2008 | Warrier et al. |
| 2008/0222466 A1 | 9/2008 | Gonzalez et al. |
| 2009/0199019 A1 | 8/2009 | Hongisto et al. |
| 2009/0288092 A1 | 11/2009 | Yamaoka |
| 2010/0037038 A1 | 2/2010 | Bieswanger et al. |
| 2012/0060170 A1 | 3/2012 | Vajda |
| 2012/0173906 A1 | 7/2012 | Elnozahy et al. |
| 2012/0227048 A1 | 9/2012 | Elnozahy et al. |
| 2012/0284729 A1 | 11/2012 | Sharda et al. |
| 2013/0238912 A1 | 9/2013 | Priel et al. |
| 2013/0246781 A1 | 9/2013 | Qi et al. |
| 2014/0059262 A1 | 2/2014 | Davis et al. |
| 2015/0012731 A1 | 1/2015 | Hum et al. |
| 2016/0092274 A1 | 3/2016 | Singh et al. |
| 2016/0210174 A1 | 7/2016 | Hsieh et al. |

FOREIGN PATENT DOCUMENTS

| | | |
|---|---|---|
| WO | WO-2011104245 | 9/2011 |
| WO | WO-2013169249 | 11/2013 |
| WO | WO-2015163897 | 10/2015 |

OTHER PUBLICATIONS

Kumar,"Improved scheduler for multi-core many-core systems", In Journal of Computing, vol. 96, Issue 11, Nov. 2014, 3 pages.

Mittal,"A Survey of Techniques for Improving Energy Efficiency in Embedded Computing Systems", In Proceedings of Computer Research Repository, Jan. 2014, 12 pages.

"International Search Report and Written Opinion Issued in PCT Application No. PCT/US2017/058928", dated Feb. 19, 2018, 15 Pages.

Kandhalu,"Energy-Aware Partitioned Fixed-Priority Scheduling for Chip Multi-processors", In Proceedings of IEEE 17th International Conference on Embedded and Real-Time Computing Systems and Applications, Aug. 28, 2011, pp. 93-102.

Sciacca,"Improving processors through better scheduling", http://ibmresearchnews.blogspot.in/2014/01/improving-processors-through-better.html?m=1, Jan. 2014, 3 pages.

Seo,"Energy Efficient Scheduling of Real-Time Tasks on Multicore Processors", In Proceedings of IEEE Transactions on Parallel and Distributed Systems, vol. 19, Issue 11, Nov. 2008, pp. 1540-1552.

* cited by examiner

THREAD IMPORTANCE BASED PROCESSOR CORE PARTITIONING

RELATED APPLICATIONS

This application claims priority to U.S. Provisional Application No. 62/417,837, filed Nov. 4, 2016, entitled "Thread Importance Based Processor Core Partitioning", the disclosure of which is hereby incorporated by reference herein in its entirety.

BACKGROUND

As computing technology has advanced, computers have become increasingly commonplace in our lives. Many computing devices are designed to run on battery power, such as mobile phones, tablet computers, and so forth. Having such mobility with computing devices increases their usability, but is not without its problems. One such problem is that the wide variety of functionality provided by these computing devices consumes a significant amount of power. This leads to draining the battery, leaving the user unable to use the computing device until the computing device is recharged. This can lead to users being unable to use their devices in the manner they desire, and user frustration with their devices.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a first group of one or more processor cores in a device is configured to run at a first frequency range. A second group of one or more processor cores in the device is configured to run at a second frequency range, the second frequency range including frequencies that are lower than frequencies in the first frequency range. An importance level of a first thread scheduled to be executed on the device is determined, the importance level being one of multiple different importance levels. A determination is made, based on the importance level of the first thread, whether the first thread is to be executed on the first group of one or more processor cores or the second group of one or more processor cores. The first thread is scheduled for execution on the determined group of one or more processor cores.

In accordance with one or more aspects, a first group of multiple processor cores is configured to run in accordance with a first energy performance preference, each processor core in the first group of processor cores being associated with a first importance level. A second group of the multiple processor cores is configured to run in accordance with a second energy performance preference, each processor core in the second group of processor cores being associated with a second importance level, the first energy performance preference indicating to be more aggressive at increasing frequency than the second energy performance preference. An importance level of a first thread scheduled to be executed on the computing device is determined, and the first thread is scheduled for execution on the one of the first group of multiple processor cores or the second group of multiple processor cores that is associated with the same importance level as the first thread.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Figure 1:
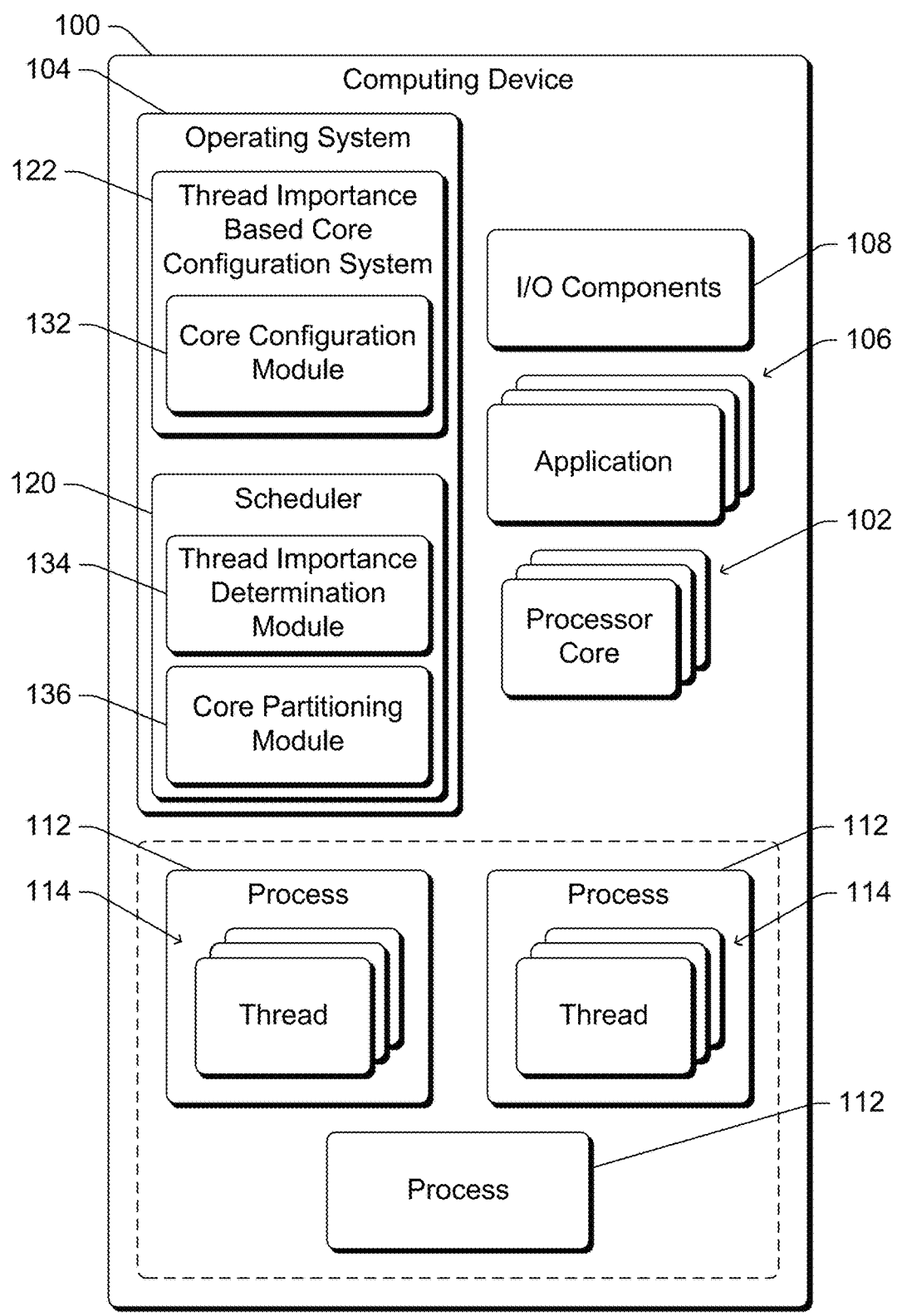
FIG. 1 is a block diagram illustrating an example computing device implementing the thread importance based processor core partitioning in accordance with one or more embodiments.

Thread importance based processor core partitioning is discussed herein. A computing device includes one or more processors, and each processor includes one or more processor cores (also referred to herein as simply cores). Various programs are run on the computing device as one or more processes, each process including one or more threads. Each processor core supports various different frequency ranges, also referred to as p-states, and can operate to run threads at any one of those different frequency ranges. The efficiency of a processor core varies at different frequency ranges, and is typically not linear. For example, the amount of work done by the processor increases approximately linearly with the frequency of the processor core, but the amount of power consumed to perform that amount of work can increase at a faster rate (e.g., exponentially).

Threads in a computing device are assigned one of multiple importance levels. There can be two importance levels (e.g., important and unimportant), or alternatively any number of importance levels. The importance level of a thread can be determined based on various different factors, such as whether the thread belongs to the foreground process or its descendants, whether the thread owns a foreground or visible window, whether the thread is involved in audio playback, and so forth.

Processor cores in the computing device are partitioned into multiple groups, such as one group corresponding to each of the multiple importance levels. In one or more embodiments, each group of processor cores is configured to run at a particular frequency range, and threads are scheduled for execution on a processor core in one of the groups of processor cores based on the thread importance. For example, one group of processor cores may be referred to as a "silver" group and each processor core in the silver group can be configured to run at a frequency range that is most efficient (or within a threshold amount, such as 5%, of being most efficient) for the processor core. The most efficient frequency range for the processor core refers to the one or more frequencies having the maximum or highest performance per watt (units of power) for the processor core. Another group of processor cores may be referred to as a "gold" group and each processor core in the gold group can be configured to run at a higher frequency range than the processor cores in the silver group. The higher frequency range of the gold group allows threads executed by the processor cores in the gold group to be executed faster than threads executed by the processor cores in the silver group, but also at a performance level that is less efficient (e.g., less work done per watt and thus higher energy usage per unit of work done) than the frequency range at which the processor cores in the silver group run. Threads having an importance level of unimportant can be executed by the silver group of processor cores, and threads having an importance level of important can be executed by the gold group of processor cores.

Additionally or alternatively, each group of processor cores is configured with a particular energy performance preference (EPP) value. The energy performance preference value indicates to the processor core to run in accordance with a particular energy performance preference preferring higher performance or lower energy usage when executing a thread. For example, one group of processor cores may be referred to as a "silver" group and each processor core in the silver group can be configured to run in accordance with an energy performance preference that indicates to prefer lower energy usage for the processor core. Another group of processor cores may be referred to as a "gold" group and each processor core in the gold group can be configured to run in accordance with an energy performance preference that indicates to prefer higher performance (and higher energy usage) than the processor cores in the silver group. Threads having an importance level of unimportant can be executed by the silver group of processor cores, and threads having an importance level of important can be executed by the gold group of processor cores.

Which processor cores are included in which group of processor cores is determined dynamically during operation of the computing device. Each processor core can switch between groups as desired by the computing device. Thus, in contrast to systems in which different groups of processor cores are grouped statically based on their physical characteristics (e.g., the processor core architecture), the techniques discussed herein allow the groupings of processor cores to change dynamically as the computing device operates. This allows the computing device to partition the processor cores based on the needs of the computing device or applications running on the computing device over time, such as having more gold processor cores but fewer silver processor cores when a large number of important threads are being executed, and having more silver processor cores but fewer gold processor cores when a small number of important threads are being executed.

Using the techniques discussed herein, power consumption of a computing device is reduced when threads having less than a particular importance level (e.g., threads with an importance level of unimportant) are run on the computing device. Threads having less than the particular importance level can be assigned to a group of processor cores that run at a frequency range that is slower than the processor cores are capable of running threads (but is more efficient) and/or in accordance with an energy performance preference that prefers lower energy usage. Thus, threads having less than the particular importance level can still execute, but additional power is not expended to execute those threads at a faster rate.

FIG. 1 is a block diagram illustrating an example computing device 100 implementing the thread importance based processor core partitioning in accordance with one or more embodiments. Computing device 100 can be a variety of different types of devices, such as a desktop computer, a server computer, a laptop or netbook computer, a mobile device (e.g., a tablet or phablet device, a cellular or other wireless phone (e.g., a smartphone), a notepad computer, a mobile station), a wearable device (e.g., eyeglasses, head-mounted display, watch, bracelet, virtual reality (VR) devices, augmented reality (AR) devices), an entertainment device (e.g., an entertainment appliance, a set-top box communicatively coupled to a display device, a game console), Internet of Things (IoT) devices (e.g., objects or things with software, firmware, and/or hardware to allow communication with other devices), a television or other display device, an automotive computer, and so forth. Thus, computing device 100 may range from a full resource device with substantial memory and processor resources (e.g., personal computers, game consoles) to a low resource device with limited memory and/or processing resources (e.g., traditional set-top boxes, hand-held game consoles).

Computing device 100 includes one or more processor cores 102, an operating system 104, one or more applications 106, and one or more input/output (I/O) components 108. The processor cores 102 can be included as part of a single processor (e.g., a multi-core processor) chip and/or as part of separate processor chips. In one or more embodiments, the processor cores 102 are a set of homogeneous processor cores 102. A set of homogeneous processor cores have the same physical characteristics, such as the same architecture, the same performance frequency range, the same power efficiency index, and so forth. Alternatively, the processor cores 102 may include processor cores having different physical characteristics.

The I/O components 108 include various components or modules configured to output data or instructions from the computing device 100 and/or receive data or instructions for the computing device 100. The I/O components, include for example, communication components (e.g., supported wireless and/or wired communication), user output components (e.g., display components), user input components (e.g., keyboards), and so forth.

The operating system 104 manages execution of the applications 106. The applications 106 can be any of a variety of different types of applications, such as productivity applications, gaming or recreational applications, utility applications, and so forth. The operating system 104 itself can also be made up of multiple programs and the operating system 104 manages execution of those modules or programs as well.

The applications 106 and the operating system 104 are executed as one or more processes 112 on the computing device 100. Each process 112 is an instantiation of an application 106 or a part of (e.g., a module of) the operating system 104. Each process 112 typically includes more threads 114. However, in some situations a process 112 does not include multiple threads 114, in which case the process can be treated as a single thread process.

The operating system 104 manages execution of the applications 106 by scheduling execution of the threads 114 of the applications 106. The operating system 104 also schedules execution of the threads 114 of programs of the operating system 104. Scheduling a thread for execution refers to informing a processor core 102 to execute the instructions of the thread.

Each processor core 102 operates to run threads 114 at a particular frequency range or within a particular frequency range. The processor core 102 has an associated maximum frequency at which it can run, but in one or more embodiments is also configurable to run at a particular frequency or within a particular frequency range specified by a program running on the computing device 100. In one or more embodiments, the processor core 102 has two registers that can be written to by a program running on the computing device 100 (e.g., a module of the operating system 104) to set upper and lower frequencies specifying a frequency range within which the processor core 102 is to run. The processor core 102 proceeds to operate within that specified frequency range to execute threads. Additionally or alternatively, the processor 102 can have a single register that is written to by a program running on the computing device 100 to specify a frequency at which the processor core 102 is to run. The processor core 102 proceeds to operate at that specified frequency (or within a frequency range determined based on the specified frequency range, such as the specified frequency range plus or minus 5%).

Additionally or alternatively, each processor core 102 can be configured with an energy performance preference (EPP). The energy performance preference indicates to the processor whether to prefer high performance or lower energy usage when executing threads. For example, on an EPP scale from 0 to 100, an EPP value of 0 would mean "highest performance" and an EPP value of 100 would mean "lowest energy". The processor core 102 contains internal logic to modulate frequency itself based on utilization. Lower EPP values would make the processor core 102 more aggressive at increasing frequency in response to an increase in utilization of the processor core 102, and vice versa. Additionally or alternatively, internal processor core 102 logic can determine, for example, that the processor core 102 would not boost frequency above a certain point if the EPP is greater than some particular value. In one or more embodiments, the processor core 102 has a register that can be written to by a program running on the computing device 100 (e.g., a module of the operating system 104) to set the energy performance preference in accordance with which the processor core 102 is to run.

The operating system 104 includes a scheduler 120 and a thread importance based core configuration system 122. The scheduler 120 determines which threads 114 to schedule at which times for execution by which processor cores 102. The scheduler 120 can make these scheduling decisions in a variety of different manners based on various public and/or proprietary techniques, such as based on the priorities assigned to threads by the operating system 104, based on how much execution time each thread has already been scheduled for, and so forth. The scheduler 120 also makes these scheduling decisions based at least in part on the importance levels of the threads, as discussed in more detail below.

The thread importance based core configuration system 122 in conjunction with the scheduler 120 determines the importance level of each thread 114 (also referred to as the importance of each thread) running on the computing device 100, and configures the processor cores 102 based on the determined importance levels. The thread importance based core configuration system 122 includes a core configuration module 132, and the scheduler 120 includes a thread importance determination module 134 and a core partitioning module 136. The thread importance determination module 134 determines the importance level of each thread 114 using various different rules or criteria, as discussed in more detail below. The core configuration module 132 determines a frequency range for a processor core 102 based on the group into which the processor core 102 is partitioned, and provides configuration information to that processor core 102 so that processor core 102 runs at the determined frequency range. Additionally or alternatively, the core configuration module 132 can determine the energy performance preference for a processor core 102 based on the group into which the processor core 102 is partitioned, and provide configuration information to that processor core 102 so that the processor core 102 runs in accordance with the determined energy performance preference. The core configuration module 132 may also determine a frequency range for a processor core 102 based on the importance level of the thread 114 running on that processor core 102. The core partitioning module 136 determines which processor cores 102 are in which of multiple different groups. The group that a processor core 102 is assigned to can change over time, as discussed in more detail below.

Each processor core 102 can operate to execute threads 114 in different frequency ranges. Typically, executing threads at higher frequencies results in faster execution of the thread 114 than when executed at lower frequencies, but also more power consumption than when executed at lower frequencies. In one or more embodiments, the thread importance based core configuration system 122 is configured with or otherwise obtains an indication of various different frequency ranges associated with different importance levels for threads. In one or more embodiments, these associated frequency ranges are selected or determined so that threads of lower importance are executed at a frequency range that is more efficient (e.g., within a threshold amount of being the most efficient frequency range for the processor core 102 executing the thread) but slower than threads of higher importance. The thread importance based core configuration system 122 takes advantage of the importance level of a thread to reduce power consumed by the processor core 102 in executing the thread, keeping in mind that unimportant work (e.g., done by threads having a lower importance level) is not urgent.

In one or more embodiments, the indications of the different frequency ranges associated with different importance levels for threads is provided to the thread importance based core configuration system 122. These indications can be pre-configured in the thread importance based core configuration system 122, can be maintained in a data store (e.g., a registry, database, etc.) accessible to the thread importance based core configuration system 122, and so forth. In such situations, the indications are pre-determined by another device or component, such as a manufacturer of the processor core 102, an original equipment manufacturer (OEM) of the computing device 100, and so forth.

Additionally or alternatively, the thread importance based core configuration system 122 determines the different frequency ranges associated with different importance levels for threads. The thread importance based core configuration system 122 can determine the different frequency ranges associated with different importance levels for threads in various different manners. In one or more embodiments, the thread importance based core configuration system 122 includes a module that runs workloads (e.g., sets of instructions) on the processor cores 102 to determine the various frequency ranges as follows.

Figure 2:
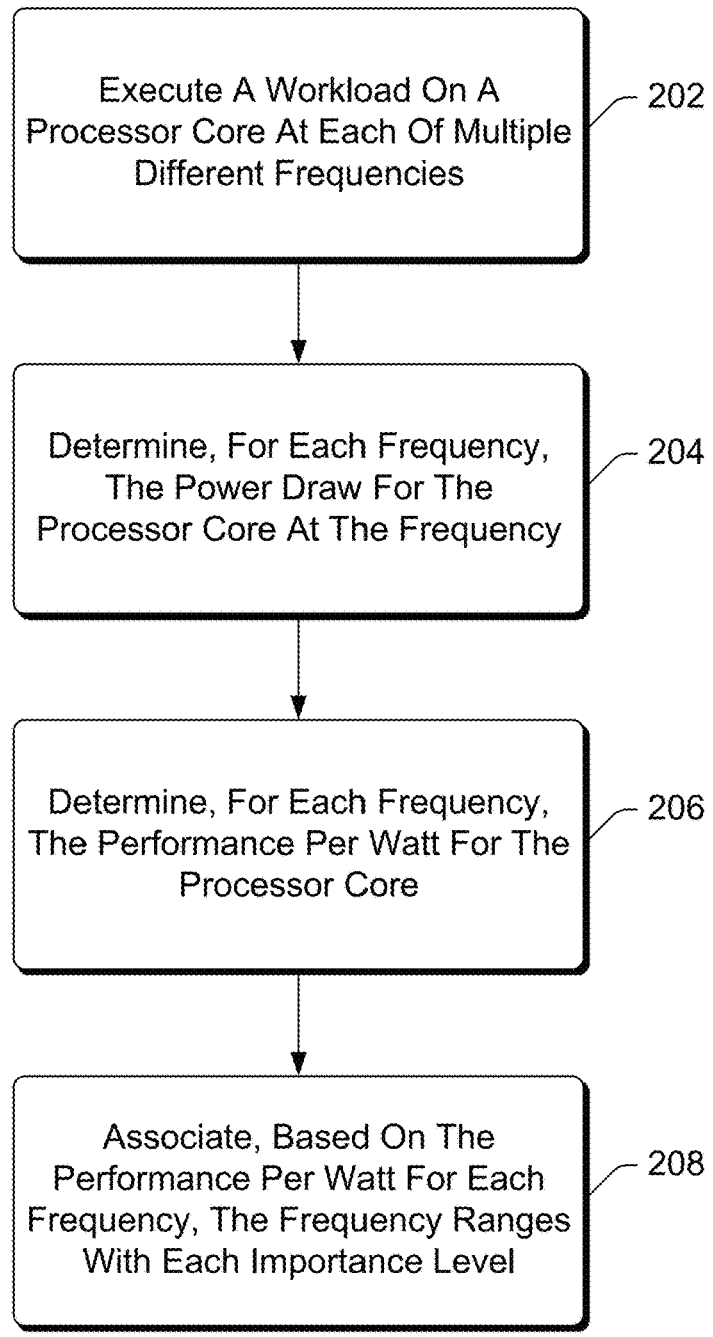
FIG. 2 is a flowchart illustrating an example process for determining the different frequency ranges associated with different importance levels for threads in accordance with one or more embodiments.

FIG. 2 is a flowchart illustrating an example process 200 for determining the different frequency ranges associated with different importance levels for threads in accordance with one or more embodiments. Process 200 is carried out by a computing device, such as computing device 100 of FIG. 1, and can be implemented in software, firmware, hardware, or combinations thereof. Process 200 is shown as a set of acts and is not limited to the order shown for performing the operations of the various acts. Process 200 is an example process for implementing the determining the different frequency ranges associated with different importance levels for threads; additional discussions of implementing the determining the different frequency ranges associated with different importance levels for threads are included herein with reference to different figures.

In process 200, a workload is executed on a processor core at each of multiple different frequencies (act 202). The workload is a set of instructions. The frequency at which the processor core runs can be specified by a program running on the computing device 102, such as by setting one or more registers of the processor core as discussed above. The workload is executed on the processor core at each of multiple different frequencies, such as by starting at a lower frequency (e.g., 500 Megahertz (MHz)) and incrementing the frequency by 100 MHz until an upper frequency (e.g., a top rated frequency of the processor core, such as 2.9 Gigahertz (GHz)). Thus, for example, the workload is executed at 500 MHz, then at 600 MHz, then at 700 MHz, and so forth.

For each frequency at which the workload is executed, the power draw for the processor core at that frequency is determined (act 204). The power draw for the processor core at that frequency can be determined in a variety of different manners. In one or more embodiments, the processor core includes a register in which the processor core records how much energy (e.g., how many joules) is being consumed by the processor core at any given time. This register is read by a program running on the computing device 102, and the average power draw at the frequency at which the processor core is running can be readily determined by dividing the amount of energy being consumed by the processor core while running at that frequency by the amount of time the processor core was running at that frequency.

For each of the multiple different frequencies in act 202 at which the workload was executed, the performance per watt for the processor core is determined (act 206). The performance per watt can be readily generated by, for each of the multiple different frequencies, dividing the frequency by the power draw determined at that frequency. Although the performance per watt is discussed herein, it should be noted that units of power other than the watt can alternatively be used.

Based on the performance per watt for each of the multiple frequencies, the frequency ranges are associated with each importance level (act 208). Various different rules or criteria can be applied to associate the importance levels with frequency ranges. In one or more embodiments, two importance levels are used: important and unimportant. Given the performance per watt for each of the multiple different frequencies, one or more frequencies that give a maximum or highest performance per watt can be readily identified. The frequency range for the unimportant importance level includes the one or more frequencies having the maximum or highest performance per watt (or one or more frequencies within a threshold amount of the one or more frequencies that give a maximum or highest performance per watt, such as 5%). The frequency range for the unimportant importance level can also include additional frequencies, such as frequencies having a performance per watt that is within a threshold amount (e.g. 5%) of the maximum or highest performance per watt. Continuing with this example, the frequency range for the important importance level ranges from the upper end of the frequency range for the unimportant importance level to another value that satisfies a performance threshold. This performance threshold can be determined in various manners, such as a frequency having a performance per watt that is a threshold amount (e.g., 10%) below the maximum or highest performance per watt.

The process 200 can be performed for each processor core 102 in the computing device 100. Alternatively, if two processor cores 102 are the same (e.g., operate at the same speeds, have the same architecture, etc.), then the frequency ranges associated with each importance level determined in act 208 for one of the processor cores 102 can be used for other processor cores 102 that are the same.

Figure 3:
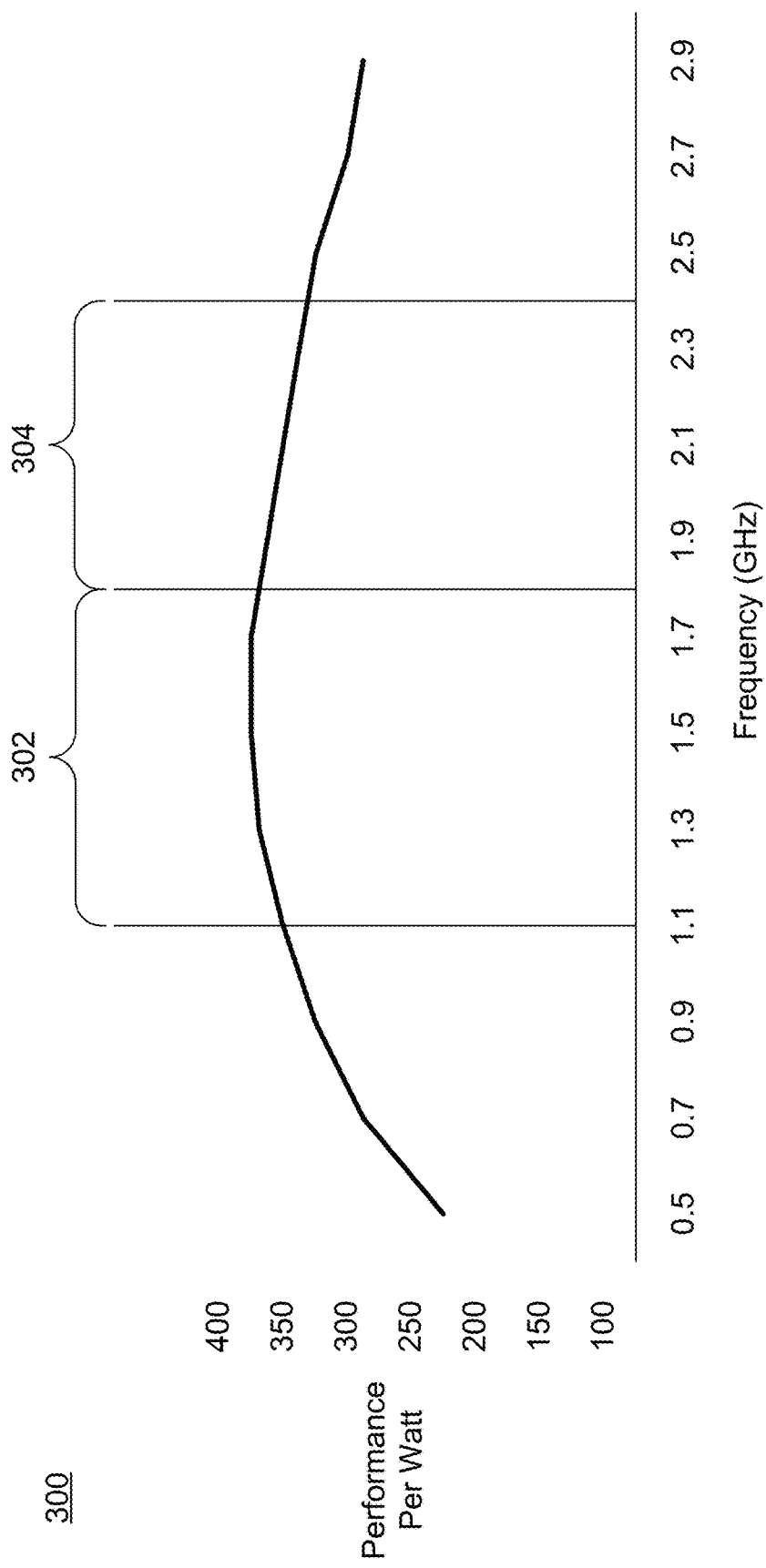
FIG. 3 illustrates an example graph of performance of a processor core in accordance with one or more embodiments.

FIG. 3 illustrates an example graph 300 of performance of a processor core in accordance with one or more embodiments. On the horizontal (X) axis is processor core frequency in GHz, and on the vertical (Y) axis is performance per watt. A frequency range 302, ranging from 1.1 GHz to 1.8 GHz, is associated with the unimportant importance level. A frequency range 304, ranging from 1.8 GHz to 2.4 GHz, is associated with the important importance level.

Returning to FIG. 1, the thread importance determination module 134 determines the importance level of each thread 114. Various different rules or criteria can be used to determine the importance level of a thread 114. In one or more embodiments, two importance levels are used: important and unimportant. By default a thread 114 is determined to have the unimportant importance level unless one or more criteria indicate that the thread 114 is to have the important importance level. Various different criteria are discussed herein. It should be noted that these criteria are examples, and that not all these criteria need be used and/or additional criteria can be used.

One criteria used to determine whether the thread 114 is to have the important importance level is whether the thread 114 belongs to the foreground process or its descendants. A foreground process refers to the foremost or foreground process running on the computing device 100. The descendants of the foreground process are processes spawned by the foreground process. If the thread 114 belongs to the foreground process or the descendants of the foreground process, then the thread 114 is determined to have the important importance level.

Another criteria used to determine whether the thread 114 is to have the important importance level is whether the thread 114 owns a foreground or visible window. A foreground or visible window refers to a window that is being displayed by the computing device 109 and is visible (e.g., seen by a user looking at the display of the computing device 100). If the thread 114 owns a foreground or visible window, then the thread 114 is determined to have the important importance level.

Another criteria used to determine whether the thread 114 is to have the important importance level is whether the thread is working on behalf (e.g., via cross-thread/process communication mechanism) of another thread having the important importance level. Which threads are working on behalf of another thread is indicated in the data associated with the threads (e.g., thread metadata maintained by the operating system 104). The chain of threads working on behalf of other threads can be followed by the thread importance based core configuration system 122 to determine whether a thread is working on behalf of another thread having the important importance level. If the thread 114 is working on behalf of another thread having the important importance level, then the thread 114 is determined to have the important importance level.

Another criteria used to determine whether the thread 114 is to have the important importance level is whether the thread 114 has high CPU (processor) priority. A thread 114 typically has a normal priority, but can be increased to a high priority thread by the operating system 104 for any of a variety of different reasons, such as the thread 114 is waiting for I/O, the thread 114 belongs to a foreground process, the thread 114 is contending a lock, and so forth. If the thread 114 has high CPU priority, then the thread 114 is determined to have the important importance level.

Another criteria used to determine whether the thread 114 is to have the important importance level is whether the thread 114 is a system thread. A system thread refers to a thread belonging to a process of the operating system 104. Threads belonging to all processes of the operating system 104 can be system threads, or alternatively only some threads (e.g., kernel mode threads or threads otherwise designated by the operating system 104) can be system threads. If the thread 114 is a system thread, then the thread 114 is determined to have the important importance level.

Another criteria used to determine whether the thread 114 is to have the important importance level is whether the thread 114 is involved in audio playback. A thread 114 is involved in audio playback if the thread belongs to a process that plays back audio data (e.g., a process that is an instantiation of a music player program). If the thread 114 is involved in audio playback, then the thread 114 is determined to have the important importance level.

Another criteria used to determine whether the thread 114 is to have the important importance level is whether the thread 114 is involved in displaying graphics. A thread 114 is involved in displaying graphics if the thread belongs to a process that generates video data (e.g., a process that is an instantiation of a movie player program) or otherwise processes video data. If the thread 114 is involved in displaying graphics, then the thread 114 is determined to have the important importance level.

Another criteria used to determine whether the thread 114 is to have the important importance level is whether the thread 114 has explicitly requested to have the important importance level. A thread 114 may request to have the important importance level for any of a variety of different reasons, such as the thread 114 does not want to be throttled. If the thread 114 has explicitly requested to have the important importance level, then the thread 114 is determined to have the important importance level.

Another criteria used to determine whether the thread 114 is to have the important importance level is whether the thread 114 belongs to applications that are known to be in the background. An application in the background refers to, for example, an application that is minimized or otherwise not visible on a display of the computing device 102 (e.g., not visible to a user of the computing device 102 looking at a display of the computing device 102). If the thread 114 belongs to an application that is known to be in the background, then the thread 114 is determined to have the unimportant importance level.

Although examples are included herein for two different importance levels, it should be noted that the thread importance based core configuration system 122 and scheduler 120 can support any number of different importance levels. Various different rules or criteria are used to determine which of the multiple different importance level a thread 114 has.

For example, the thread importance based core configuration system 122 and scheduler 120 can support three importance levels: unimportant, important, and super-important. One or more of the criteria discussed above can be used to determine whether a thread 114 has an important importance level or an unimportant importance level. Additional criteria can be used to determine whether a thread 114 has a super-important importance level, such as whether the thread 114 is within a threshold amount of time of missing a deadline. Various threads 114 can have different deadlines for when they must be run, such as when playing back of audio data or video data. If a thread 114 is within a threshold amount of time (e.g., 5 milliseconds) of missing a deadline, then the thread 114 is determined to have the super-important importance level.

The core partitioning module 136 partitions (also referred to herein as groups) the processor cores 102 into different groups. In one or more embodiments, the processor cores 102 are partitioned into as many different groups as there are importance levels for threads 114, and each importance level is associated with one of the multiple different groups. By way of example, if the multiple different importance levels for threads include two importance levels (e.g., important and unimportant), then the core partitioning module 136 groups the processor cores 102 into two groups (e.g., gold and silver groups). One importance level is associated with one of the groups (e.g., the important importance level is associated with the gold group) and the other importance level is associated with the other of the groups (e.g., the unimportant importance level is associated with the silver group). By way of another example, if the multiple different importance levels for threads include three importance levels (e.g., unimportant, important, and super-important), then the core partitioning module 136 groups the processor cores 102 into three groups (e.g., silver, gold, and platinum groups). One importance level is associated with each of the groups (e.g., the unimportant importance level is associated with the silver group, the important importance level is associated with the gold group, and the super-important importance level is associated with the platinum group).

In one or more embodiments, the core partitioning module 136 notifies the core configuration module 132 of which processor cores 102 are assigned to which groups, and the core configuration module 132 determines a frequency range for each processor core 102 based on the group into which the processor core 102 is partitioned. Each group is associated with a particular importance level, and the frequency range for each processor core 102 in a particular group is determined to be the frequency range associated with that particular importance level. For example, if two importance levels (unimportant and important) are used, the core configuration module 132 determines that the processor cores 102 in the group (e.g., a silver group) associated with the unimportant importance level are to have a frequency range that is the one or more frequencies having the maximum or highest performance per watt (or one or more frequencies within a threshold amount of the one or more frequencies that give a maximum or highest performance per watt, such as 5%). Alternatively, the core configuration module 132 can determine that the one or more frequencies having the maximum or highest performance per watt have a frequency range that is too low (even for unimportant work) and thus determine that the processor cores 102 in the group (e.g., a silver group) associated with the unimportant importance level are to have a higher frequency range. Continuing with this example, the core configuration module determines that the processor cores 102 in the group (e.g., a gold group) associated with the important importance level are to have a frequency range that ranges from the upper end of the frequency range for the unimportant importance level to another value that satisfies a performance threshold (e.g., a frequency having a performance per watt that is a threshold amount (e.g., 10%) below the maximum or highest performance per watt).

The core configuration module 132 configures the processor cores 102 in each group to run in a frequency range associated with that group. The core configuration module 132 can configure a processor core 102 to run in a particular frequency range in various manners as discussed above, such as by writing one or more values indicating the frequency range to the processor cores 102. It should be noted that a frequency range as discussed herein can be a wide range (e.g., spanning 500 MHz or more), or a narrow range (e.g., spanning 50 MHz). The core configuration module 132 can also specify a single frequency that is the frequency range associated with the importance level of the thread, and realize that the processor core 102 may run at a range of frequencies that is approximately equal to (e.g., within a threshold amount, such as 3%) of the specified frequency.

Additionally or alternatively, the core configuration module 132 can provide an indication to the processor core 102 of the importance level associated with the group of which the processor core 102 is a part (e.g., a data value of "important" or "unimportant"). This importance level can also be, for example, the energy performance preference discussed above. The processor core 102 is then able to leverage this information to make various different power conservation decisions when executing threads 114. For example, the processor core 102 may be preconfigured with the frequency range for each importance level, and thus need not be informed of such frequency ranges by the thread importance based core configuration system 122. By way of another example, the processor core 102 may employ additional power conservation techniques for threads that the processor core 102 knows are unimportant, and can apply those additional power conservation techniques to threads having the unimportant importance level. By way of another example, the processor core 102 may be more or less aggressive at increasing the frequency of the processor core 102 in response to an increase in utilization of the processor core 102 based on the energy performance preference in accordance with which the processor core 102 is running.

In one or more embodiments, the core partitioning module 136 notifies the core configuration module 132 of which processor cores 102 are assigned to which groups, and the core configuration module 132 configures the processor cores 102 in each group to run in accordance with a particular energy performance preference associated with that group. The energy performance preference associated with each group can be determined in various manners, such as being pre-configured in the core configuration module 132, being retrieved from another device or service, and so forth. The core configuration module 132 can configure a processor core 102 to run in accordance with a particular energy performance preference in various manners as discussed above, such as by writing a value indicating the energy performance preference to a register of the processor cores 102.

It should be noted that the priority of a thread can influence the importance level of a thread as discussed above, but that the priority of a thread is different from the importance level of a thread. The scheduler 120 uses the priorities of threads to determine which threads get executed in which order (e.g., higher priority threads are executed before lower priority threads). The scheduler 120 uses the importance levels of threads to determine which processor core 102 the threads are executed on and what frequency ranges the threads are executed at.

The scheduler 120 schedules threads 114 for execution on processor cores 120 in the group associated with the same importance level as the thread 114. For example, the scheduler 120 schedules threads 114 having an importance level of important for execution on processor cores 102 in the gold group, and threads 114 having an importance level of unimportant for execution on processor cores 102 in the silver group. Thus, it can be seen that threads having a higher importance level are scheduled to execute on processor cores 102 running in a higher frequency range (and/or that more aggressively increase frequency in response to an increase in utilization) than processor cores 102 on which threads having a lower importance level are scheduled to execute on.

By scheduling threads having the same importance level for execution on the same group of processor cores 102, lower importance level threads can be executed in a more power efficient manner without needing to expend any time or effort in switching the frequency range and/or energy performance preference of the processor cores 102 at each context switch. For example, in contrast to changing the frequency range for a processor core 102 at each context switch based on the importance level of the thread 114 being executed, the threads 114 are selected to have the same importance level so no frequency range change is needed.

It should be noted that situations can arise, for a given thread 114, in which a processor core 102 in a group associated with the same importance level as the thread 114 is not available to execute the thread 114. A processor core 102 may not be available for various different reasons, such as the processor cores 102 in the group are already running higher priority threads. In such situations, the scheduler 120 can schedule the thread 114 for execution on a processor core 102 in a different group.

In one or more embodiments, if a thread 114 is scheduled for execution on a processor core 102 in a group different than the group associated with the same importance level as the thread 114, then the frequency range and/or energy performance preference of the processor core on which the thread 114 is executed is changed to be the frequency range and/or energy performance preference associated with the importance level of the thread 114. The frequency range of the processor core can be changed by configuring the processor core to run in the appropriate frequency range (the frequency range associated with the importance level of the thread 114) in various manners as discussed above, such as writing values to one or more registers of the processor core. The energy performance preference of the processor core can be changed by configuring the processor core to run in accordance with the appropriate energy performance preference in various manners as discussed above, such as writing values to one or more registers of the processor core. The processor core can remain running in that frequency range and/or energy performance preference for the duration of execution of the thread 114 (e.g., until the next context switch) and then return to its previous frequency range and/or energy performance preference, or alternatively can remain in that frequency range and/or energy performance preference until a thread of a different importance level is executed on the processor core.

For example, assume that there are two importance levels for threads (unimportant and important) and the importance level of unimportant is associated with a silver group of processor cores, and the importance level of important is associated with a gold group of processor cores. If a thread having an importance level of important is to be scheduled but none of the processor cores in the gold group are available to execute the thread, the scheduler 120 can schedule the thread for execution on a processor core in the silver group and notify the core configuration module 132 to configure that processor core in the silver group to execute the thread in the frequency range and/or energy performance preference associated with the important importance level. The processor core can remain in that frequency range and/or energy performance preference until the next context switch, or until the next thread is executed on the processor core having an importance level of unimportant. Similarly, if a thread having an importance level of unimportant is to be scheduled but none of the processor cores in the silver group are available to execute the thread, the scheduler 120 can schedule the thread for execution on a processor core in the gold group and notify the core configuration module 132 to configure that processor core in the gold group to execute the thread in the frequency range and/or energy performance preference associated with the unimportant importance level. The processor core can remain in that frequency range and/or energy performance preference until the next context switch, or until the next thread is executed on the processor core having an importance level of important.

The core partitioning module 136 can determine which processor cores 102 are in which groups in various different manners. In one or more embodiments, when the computing device 100 begins running (e.g., is booted or reset), the core partitioning module 136 uses a default grouping for the processor cores 102. The default grouping can be pre-configured in the core partitioning module 136, can be a user preference value that is set, can be obtained from another device or service (e.g., via the Internet), can be a value saved by the core partitioning module 136 prior to the computing device 100 last being shut down or reset, and so forth. The default grouping identifies a number of processor cores 102 to include in each group. The core partitioning module 136 selects (e.g., randomly or according to other rules or criteria) processor cores 102 for each group and notifies the scheduler 120 which processor cores 102 are in which groups. The core partitioning module 136 also notifies the core configuration module 132 which processor cores 102 are in which groups (and/or the frequency ranges for each processor core 102), and the core configuration module 132 configures the processor cores to run in the appropriate frequency ranges and/or energy performance preferences as discussed above.

The core partitioning module 136 also monitors the operation of the computing device 100, including the threads 114 being executed on the computing device 100, and determines when to adjust the number of processor cores 102 in a particular group. The core partitioning module 136 can determine to adjust the number of processor cores 102 in a particular group at regular or irregular intervals, in response to a particular event occurring or condition being satisfied, and so forth. A processor core 102 can be re-assigned from a group associated with a lower importance level to a group associated with a higher importance level, also referred to as upgrading the processor core 102. A processor core 102 can be re-assigned from a group associated with a higher importance level to a group associated with a lower importance level, also referred to as downgrading the processor core 102. In one or more embodiments, one processor core 102 is upgraded or downgraded at a time. Alternatively, multiple processor cores 102 can be upgraded or downgraded at a time (e.g., two processor cores 102 may be upgraded from the silver group to the gold group).

To re-assign a processor core 102 to a different group, the core partitioning module 136 notifies the scheduler 120 of the new group for the processor core 102. The core partitioning module 136 also notifies the core configuration module 132 of the new group for the processor core 102, and the core configuration module 132 configures the processor core 102 to run in the frequency range and/or energy performance preference of the new group as discussed above.

The core partitioning module 136 can maintain various statistics regarding the running of threads in the computing device 100. These statistics can include, for example the utilization of the processor cores 102 over some time duration (e.g., the preceding 50 milliseconds (ms)) by threads having a particular importance level (e.g., an importance level of important). Another example statistic is the number of concurrent threads to be executed over some time duration (e.g., the preceding 50 ms) by threads having a particular importance level (e.g., an importance level of important). Another example is how many threads having a particular importance level (e.g., an importance level of important) are waiting in a ready queue (waiting to be executed) at the current time or have been waiting in the ready queue at some point in time over some time duration (e.g., the preceding 50 ms).

Various different rules or criteria can be applied to these statistics to determine whether to adjust the number of processor cores 102 in a particular group. For example, if there is at least a threshold utilization (e.g., 20%) of the processor cores 102 over some time duration by threads having an importance level of important then the core partitioning module 136 can determine to increase the number of processor cores in the gold group. Or, if there is less than a threshold utilization (e.g., 3%) of the processor cores 102 over some time duration by threads having an importance level of important then the core partitioning module 136 can determine to decrease the number of processor cores in the gold group.

By way of another example, if there is at least a threshold number (e.g., 3 greater than the number of processor cores in a gold group) of concurrent threads executed over some time duration by threads having an importance level of important then the core partitioning module 136 can determine to increase the number of processor cores in the gold group. Or, if there is less than a threshold number (e.g., fewer than the number of processor cores in a gold group) of concurrent threads executed over some time duration by threads having an importance level of important then the core partitioning module 136 can determine to decrease the number of processor cores in the gold group. By way of another example, if there are more concurrent threads executed over some time duration (e.g., 50 ms) having an importance level of important then the core partitioning module 136 can determine to increase the number of processor cores in the gold group.

By way of another example, if there is at least a threshold number (e.g., 8) of threads having an importance level of important in a ready queue (waiting to be executed) over some time duration then the core partitioning module 136 can determine to increase the number of processor cores in the gold group. Or, if there is less than a threshold number (e.g., 2) threads having an importance level of important in a ready queue (waiting to be executed) over some time duration then the core partitioning module 136 can determine to decrease the number of processor cores in the gold group.

The core partitioning module 136 can also combine these statistics in various manners to determine whether to adjust the number of processor cores 102 in a particular group. For example, a numeric value can be associated with each of these statistics and those numeric values combined (e.g., added together, averaged, weighted averaging, etc.) to determine whether a threshold value is met to indicate to adjust the number of processor cores 102 in a particular group.

If a processor core 102 is to be re-assigned to a different group, then the core partitioning module 136 also determines which processor core is to be re-assigned. For example, if there are four processor cores in a silver group and four processor cores in a gold group, and one of the processor cores in the silver group is to be upgraded to the gold group, the core partitioning module 136 determines which of the four processor cores in the silver group is to be upgraded. The core partitioning module 136 can determine which processor core is to be re-assigned in various manners.

In one or more embodiments, the core partitioning module 136 selects a processor core at random. Alternatively, various other rules or criteria can be used to select which processor core to re-assign. The core partitioning module 136 can maintain various information regarding the processor cores and/or threads executed by the processor cores and use this information to make the selection. This information can include, for example, how frequently each processor core had its frequency range and/or energy performance preference increased or decreased over some time duration (e.g., the preceding 50 ms) as a result of executing a thread having an importance level different from the importance level associated with the current group of which the processor core is a part. If a processor core is to be upgraded, then the processor core that had its frequency range increased and/or energy performance preference decreased most frequently over the time duration can be selected. Or, if a processor core is to be downgraded, then the processor core that had its frequency range decreased and/or energy performance preference increased most frequently over the time duration can be selected.

This information can additionally or alternatively include an indication of how many threads of each of the multiple different importance levels are executed on each of the processor cores over some time duration (e.g., the preceding 50 ms). If a processor core is to be downgraded, then the processor core that executed the largest number of threads having an importance level less than the importance level associated with the group that includes the processor core can be selected. Or, if a processor core is to be downgraded, then the processor core that executed the smallest number of threads having an importance level that is the same as the importance level associated with the group that includes the processor core can be selected. Or, if a processor core is to be upgraded, then the processor core that executed the largest number of threads having an importance level higher than the importance level associated with the group that includes the processor core can be selected.

Various other information or criteria can also be used to determine which processor core is to be selected. For example, if the processor cores 102 include physically different cores, the core partitioning module 136 can attempt to keep processor cores 102 capable of higher performance (e.g., running at higher frequency ranges) in groups associated with higher importance levels. Thus, the core partitioning module 136 can select a processor core capable of higher performance for upgrading rather than another processor core not capable of the higher performance.

The core partitioning module 136 can also use various additional configuration information or settings to determine whether to adjust the number of processor cores 102 in a particular group. This configuration information or settings can be restrictions on how many processor cores can be included in a particular group, adjustments to thresholds or other criteria used to determine whether to upgrade or downgrade a processor core 102 in a particular group, and so forth.

In one or more embodiments, the core partitioning module 136 determines whether to adjust the number of processor cores 102 in a particular group based at least in part on whether the computing device 100 is being powered by battery or by AC. In situations in which the computing device 100 is powered by AC, the core partitioning module 136 can use lower threshold values when determining whether to upgrade a processor core and higher threshold values when determining whether to downgrade a processor core, which can make it more likely that processor cores will be upgraded and/or be in the groups associated with higher importance levels. However, if the computing device 100 is powered by battery, then the threshold values the core partitioning module 136 can use higher threshold values when determining whether to upgrade a processor core and lower threshold values when determining whether to downgrade a processor core, which can make it less likely that processor cores will be upgraded and/or more likely that processor cores will be in the groups associated with lower importance levels. This influences, for example, core partitioning module 136 to be more aggressive in keeping processor cores in more power efficient frequency ranges when the computing device 100 is powered by battery than when powered by AC.

In one or more embodiments, the core partitioning module 136 determines whether to adjust the number of processor cores 102 in a particular group based at least in part on whether the computing device 100 is in a battery saver mode. A battery saver mode is a mode of the computing device 100 designed to conserve battery power. In situations in which the computing device 100 is not in a battery saver mode, the core partitioning module 136 can use lower threshold values when determining whether to upgrade a processor core and higher threshold values when determining whether to downgrade a processor core, which can make it more likely that processor cores will be upgraded and/or be in the groups associated with higher importance levels. However, if the computing device 100 is in a battery saver mode, then the threshold values the core partitioning module 136 can use higher threshold values when determining whether to upgrade a processor core and lower threshold values when determining whether to downgrade a processor core, which can make it less likely that processor cores will be upgraded and/or more likely that processor cores will be in the groups associated with lower importance levels. This influences, for example, core partitioning module 136 to be more aggressive in keeping processor cores in more power efficient frequency ranges when the computing device 100 is in a battery saver mode than when the computing device is not in a battery saver mode.

Furthermore, if the computing device is not in a battery saver mode, the core partitioning module 136 can have no limits on how many processor cores can be in the group associated with a higher (or the highest) importance level or frequency ranges. However, if the computing device is in a battery saver mode, then the core partitioning module 136 can limit how many processor cores can be in the group associated with a higher (or the highest) importance level or frequency ranges. For example, the core partitioning module 136 may only allow one or two cores in the group associated with the highest importance level or frequency ranges. This influences, for example, core partitioning module 136 to keep processor cores in more power efficient frequency ranges when the computing device 100 is in a battery saver mode than when the computing device is not in a battery saver mode.

In one or more embodiments, the core partitioning module 136 determines whether to adjust the number of processor cores 102 in a particular group based at least in part on an estimated amount of remaining battery life for the computing device 100. In situations in which the amount of remaining battery life is high (e.g., greater than a threshold value, such as 80%), the core partitioning module 136 can use lower threshold values when determining whether to upgrade a processor core and higher threshold values when determining whether to downgrade a processor core, which can make it more likely that processor cores will be upgraded and/or be in the groups associated with higher importance levels. However, if the amount of remaining battery life is low (e.g., less than a threshold value, such as 30%), then the threshold values the core partitioning module 136 can use higher threshold values when determining whether to upgrade a processor core and lower threshold values when determining whether to downgrade a processor core, which can make it less likely that processor cores will be upgraded and/or more likely that processor cores will be in the groups associated with lower importance levels. Multiple different threshold amounts of remaining battery life can be used, resulting in multiple different threshold values for determining whether to upgrade or downgrade a processor core. This influences, for example, core partitioning module 136 to be more aggressive in keeping processor cores in more power efficient frequency ranges when the amount of remaining battery life is low than when the amount of remaining battery life is higher.

In one or more embodiments, the core partitioning module 136 determines whether to adjust the number of processor cores 102 in a particular group based at least in part on whether a user input indicates a desire for high performance of the computing device 100. In situations in which a user input indicates a desire for high performance, the core partitioning module 136 can use lower threshold values when determining whether to upgrade a processor core and higher threshold values when determining whether to downgrade a processor core, which can make it more likely that processor cores will be upgraded and/or be in the groups associated with higher importance levels. However, if no user input indicates a desire for high performance, then the threshold values the core partitioning module 136 can use higher threshold values when determining whether to upgrade a processor core and lower threshold values when determining whether to downgrade a processor core, which can make it less likely that processor cores will be upgraded and/or more likely that processor cores will be in the groups associated with lower importance levels. This influences, for example, core partitioning module 136 to be more aggressive in keeping processor cores in more power efficient frequency ranges when a user input indicates a desire for high performance than when no user input indicates a desire for high performance.

In one or more embodiments, the core partitioning module 136 determines whether to adjust the number of processor cores 102 in a particular group based at least in part on a thermal condition of the computing device 100. For example, the number of processor cores 102 in a group associated with a particular importance level (e.g., a gold group running at a higher frequency range) can be limited if the temperature of the computing device 100 is too high (e.g., exceeds a threshold amount, such as 80 degrees Fahrenheit). In situations in which the temperature of the computing device 100 is not too high, the core partitioning module 136 can have no limits on how many processor cores can be in the group associated with a higher (or the highest) importance level or frequency ranges. However, if the temperature of the computing device 100 is too high, then the core partitioning module 136 limits how many processor cores can be in the group associated with a higher (or the highest) importance level or frequency ranges. For example, the core partitioning module 136 may only allow one or two cores in the group associated with the highest importance level or frequency ranges. This influences, for example, core partitioning module 136 to keep processor cores in more power efficient frequency ranges when the temperature of the computing device 100 is too high, reducing the temperature (or at least any increase in temperature).

In one or more embodiments, the core partitioning module 136 determines whether to adjust the number of processor cores 102 in a particular group based at least in part on a request from an application running on the computing device 100. For example, an application may invoke an API exposed by the core partitioning module 136 to indicate that it desires access to a particular number of high performance cores. In such situations, the core partitioning module 136 keeps at least that particular number of processor cores in a higher (or the highest) importance level or frequency ranges. This influences, for example, core partitioning module 136 to keep processor cores in higher performance frequency ranges when requested by an application 106.

Figure 4:
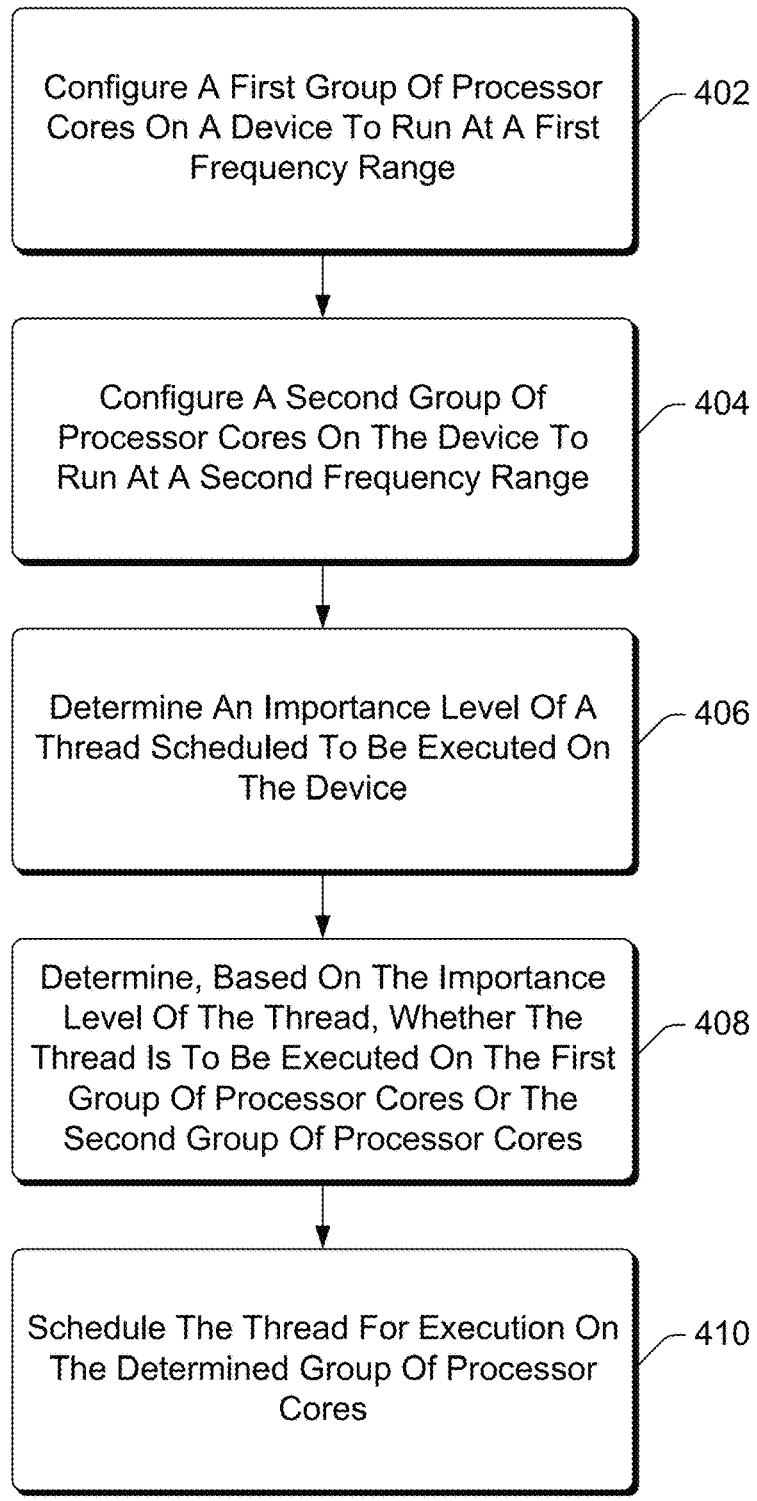
FIG. 4 is a flowchart illustrating an example process for implementing the techniques discussed herein in accordance with one or more embodiments.

FIG. 4 is a flowchart illustrating an example process 400 for implementing the techniques discussed herein in accordance with one or more embodiments. Process 400 is carried out by a computing device, such as computing device 100 of FIG. 1, and can be implemented in software, firmware, hardware, or combinations thereof. Process 400 is shown as a set of acts and is not limited to the order shown for performing the operations of the various acts. Process 400 is an example process for implementing the techniques discussed herein; additional discussions of implementing the techniques discussed herein are included herein with reference to different figures.

In process 400, a first group of processor cores on a device are configured to run at a first frequency range (act 402). This first frequency range is, for example, a high performance frequency range associated with a high (e.g., important) importance level.

A second group of processor cores on the device are configured to run at a second frequency range (act 404). This second frequency range is, for example, a power efficient frequency range associated with a lower (e.g., unimportant) importance level. The second frequency range includes frequencies that are lower than the frequencies in the first frequency range.

The configurations in acts 402 and 404 can be performed at various times, and can change over time. For example, which processor cores are included in the first frequency range and which processor cores are included in the second frequency range is dynamic and can be changed by the computing device implementing process 400 as the computing device runs.

An importance level of a thread scheduled to be executed on a processor core is determined (act 406). The importance level is one of multiple different importance levels (e.g., important and unimportant), and can be determined in a variety of different manners as discussed above.

A determination is made as to whether the thread is to be executed on the first group of processor cores or the second group of processor cores (act 408). This determination is made based on the importance level of the thread. For example, each group of processor cores has an associated importance level, and the determination is made to execute the thread on the processor core of a group having the same importance level as the thread.

The thread is scheduled for execution on the determined group of processor cores (act 410). The thread is typically executed on one of the processor cores in the determined group of processor cores.

Figure 5:
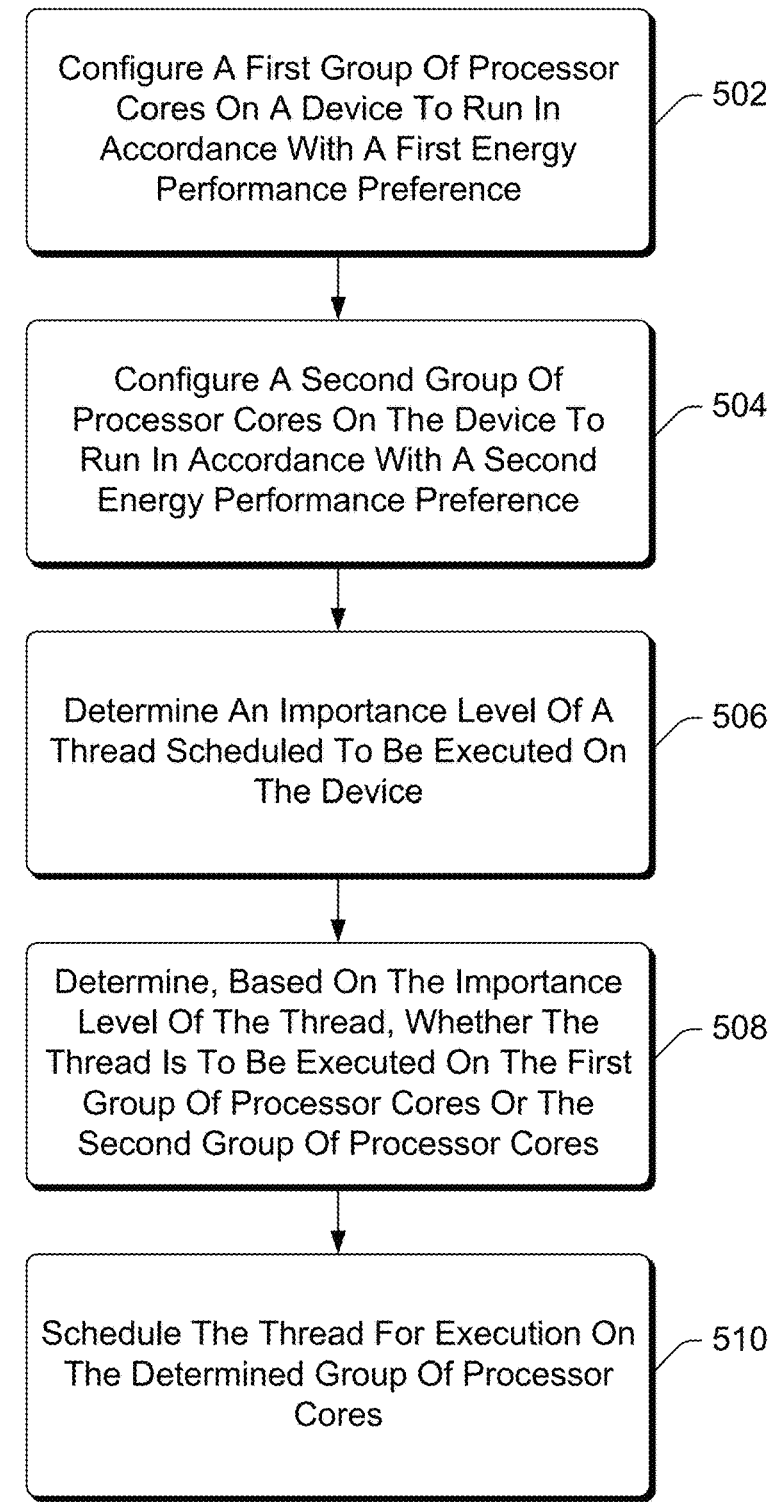
FIG. 5 is a flowchart illustrating another example process for implementing the techniques discussed herein in accordance with one or more embodiments.

FIG. 5 is a flowchart illustrating an example process 500 for implementing the techniques discussed herein in accordance with one or more embodiments. Process 500 is carried out by a computing device, such as computing device 100 of FIG. 1, and can be implemented in software, firmware, hardware, or combinations thereof. Process 500 is shown as a set of acts and is not limited to the order shown for performing the operations of the various acts. Process 500 is an example process for implementing the techniques discussed herein; additional discussions of implementing the techniques discussed herein are included herein with reference to different figures.

In process 500, a first group of processor cores on a device are configured to run in accordance with a first energy performance preference (act 502). This first energy performance preference is, for example, a high performance preference associated with a high (e.g., important) importance level.

A second group of processor cores on the device are configured to run in accordance with a second energy performance preference (act 504). This second energy performance preference is, for example, a lower performance preference associated with a lower (e.g., unimportant) importance level. The first energy performance preference indicates to processors cores to be more aggressive at increasing frequency than the second energy performance preference.

The configurations in acts 502 and 504 can be performed at various times, and can change over time. For example, which processor cores are to run in accordance with the first energy performance preference and which processor cores are to run in accordance with the energy performance preference is dynamic and can be changed by the computing device implementing process 500 as the computing device runs.

An importance level of a thread scheduled to be executed on a processor core is determined (act 506). The importance level is one of multiple different importance levels (e.g., important and unimportant), and can be determined in a variety of different manners as discussed above.

A determination is made as to whether the thread is to be executed on the first group of processor cores or the second group of processor cores (act 508). This determination is made based on the importance level of the thread. For example, each group of processor cores has an associated importance level, and the determination is made to execute the thread on the processor core of a group having the same importance level as the thread.

The thread is scheduled for execution on the determined group of processor cores (act 510). The thread is typically executed on one of the processor cores in the determined group of processor cores.

It should be noted that although processes 400 and 500 are illustrated as separate flowcharts, the two can be used concurrently. Thus, the techniques discussed herein can be used to adjust only frequency ranges of processor cores, only energy performance preferences of processor cores, or both frequency ranges and energy performance preferences of processor cores.

The techniques discussed herein thus allow decisions to be made (e.g., by the operating system) regarding configuration of processor cores, such as selecting the frequency range at which the processor cores in different groups run and scheduling threads for execution on processor cores of a particular group based on the importance levels of the threads. Thus, an intelligent power conservation system can be implemented that allows threads deemed to be of high importance to run quickly, and run threads deemed to be of less importance (e.g., because their work does not directly impact user experience and as such may not be urgent) to run with greater power savings (e.g., a highest or close to a highest efficiency for the processor core).

It should be noted that in some situations the processor cores 102 may not run at the frequency ranges for which they are configured by the core configuration module 132. Such situations can arise, for example, when multiple processor cores 102 are part of the same power domain and the chip implementing the multiple processor cores 102 does not support different concurrent frequencies for different processor cores 102. The techniques discussed herein can still be used, however, and power savings gained due to running processor cores 102 at more power efficient frequency ranges for threads of certain importance levels (e.g., importance level of unimportant). Such savings can be realized, for example, because it is assumed that processor cores 102 running at higher frequency ranges will go idle for certain amounts of time, at which point the chip will allow the processor cores running at the more power efficient frequency ranges to run at those more power efficient frequency ranges rather than the higher frequency ranges.

Figure 6:
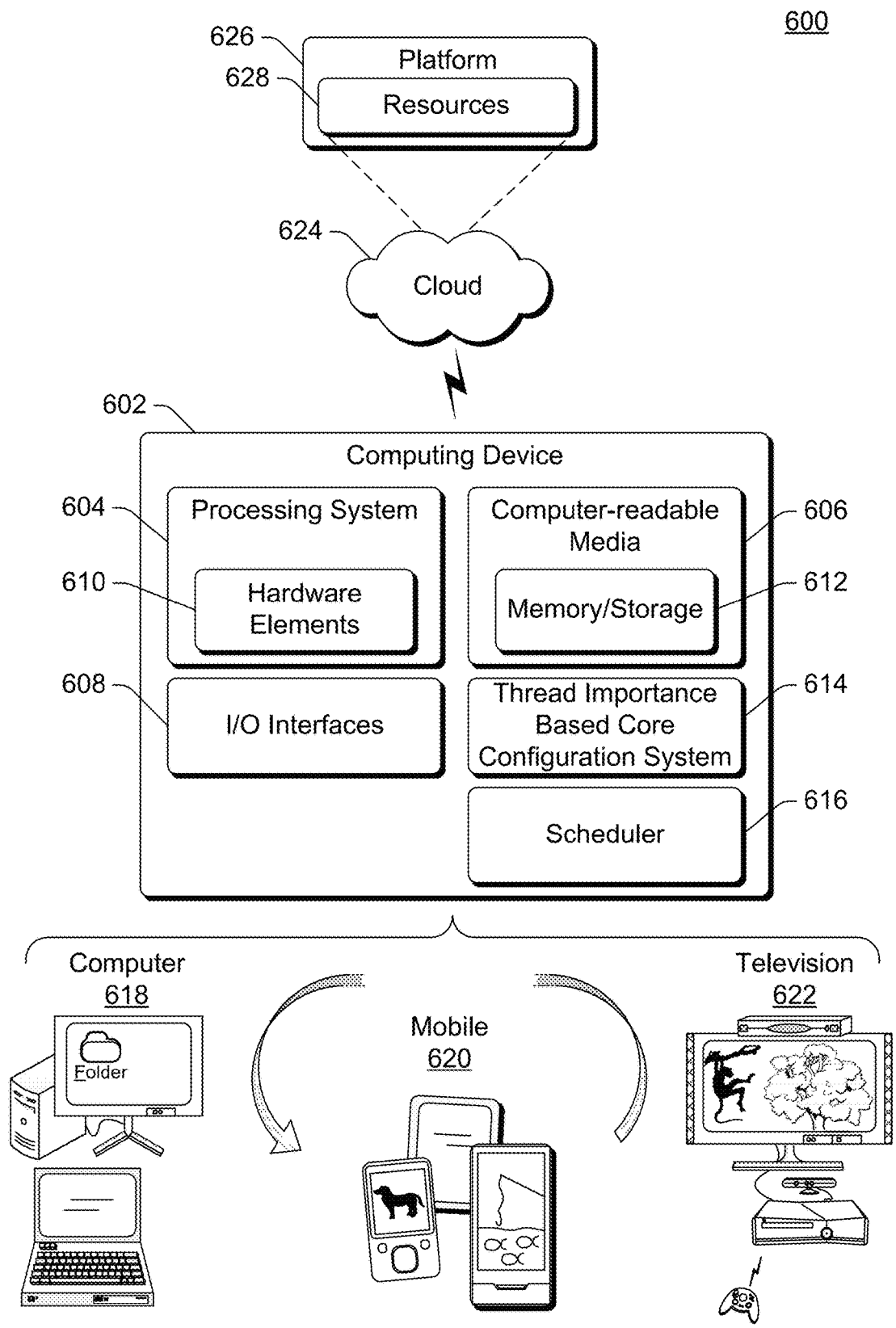
FIG. 6 illustrates an example system that includes an example computing device that is representative of one or more systems and/or devices that may implement the various techniques described herein.

FIG. 6 illustrates an example system generally at 600 that includes an example computing device 602 that is representative of one or more systems and/or devices that may implement the various techniques described herein. The computing device 602 may be, for example, a server of a service provider, a device associated with a client (e.g., a client device), an on-chip system, and/or any other suitable computing device or computing system.

The example computing device 602 as illustrated includes a processing system 604, one or more computer-readable media 606, and one or more I/O Interfaces 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware.

Accordingly, the processing system 604 is illustrated as including hardware elements 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 606 is illustrated as including memory/storage 612. The memory/storage 612 represents memory/storage capacity associated with one or more computer-readable media. The memory/storage 612 may include volatile media (such as random access memory (RAM)) and/or nonvolatile media (such as read only memory (ROM), Resistive RAM (ReRAM), Flash memory, optical disks, magnetic disks, and so forth). The memory/storage 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

The one or more input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone (e.g., for voice inputs), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 602 may be configured in a variety of ways as further described below to support user interaction.

The computing device 602 also includes a thread importance based core configuration system 614 and a scheduler 616. The thread importance based core configuration system 614 in conjunction with the scheduler 616 provides various functionality to configure groups of processor cores to run at different frequencies. The thread importance based core configuration system 614 is typically implemented as part of an operating system of the computing device 602, although alternatively can be implemented separately from the operating system. The thread importance based core configuration system 614 can implement, for example, the thread importance based core configuration system 122 of FIG. 1. The scheduler 616 can implement, for example, the scheduler 120 of FIG. 1.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "computer-readable signal media."

"Computer-readable storage media" refers to media and/or devices that enable persistent storage of information and/or storage that is tangible, in contrast to mere signal transmission, carrier waves, or signals per se. Computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, the hardware elements 610 and computer-readable media 606 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of modules as a module that is executable by the computing device 602 as software may be achieved at least partially in hardware, e.g., through use of computer-readable storage media and/or hardware elements 610 of the processing system. The instructions and/or functions may be executable/operable by one or more articles of manufacture (for example, one or more computing devices 602 and/or processing systems 604) to implement techniques, modules, and examples described herein.

As further illustrated in FIG. 6, the example system 600 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 600, multiple devices are interconnected through a central computing device. The central computing device may be local to the multiple devices or may be located remotely from the multiple devices. In one or more embodiments, the central computing device may be a cloud of one or more server computers that are connected to the multiple devices through a network, the Internet, or other data communication link.

In one or more embodiments, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one or more embodiments, a class of target devices is created and experiences are tailored to the generic class of devices. A class of devices may be defined by physical features, types of usage, or other common characteristics of the devices.

In various implementations, the computing device 602 may assume a variety of different configurations, such as for computer 618, mobile 620, and television 622 uses. Each of these configurations includes devices that may have generally different constructs and capabilities, and thus the computing device 602 may be configured according to one or more of the different device classes. For instance, the computing device 602 may be implemented as the computer 618 class of a device that includes a personal computer, desktop computer, a multi-screen computer, laptop computer, netbook, and so on.

The computing device 602 may also be implemented as the mobile 620 class of device that includes mobile devices, such as a mobile phone, portable music player, portable gaming device, a tablet computer, a multi-screen computer, and so on. The computing device 602 may also be implemented as the television 622 class of device that includes devices having or connected to generally larger screens in casual viewing environments. These devices include televisions, set-top boxes, gaming consoles, and so on.

The techniques described herein may be supported by these various configurations of the computing device 602 and are not limited to the specific examples of the techniques described herein. This functionality may also be implemented all or in part through use of a distributed system, such as over a "cloud" 624 via a platform 626 as described below.

The cloud 624 includes and/or is representative of a platform 626 for resources 628. The platform 626 abstracts underlying functionality of hardware (e.g., servers) and software resources of the cloud 624. The resources 628 may include applications and/or data that can be utilized while computer processing is executed on servers that are remote from the computing device 602. Resources 628 can also include services provided over the Internet and/or through a subscriber network, such as a cellular or Wi-Fi network.

The platform 626 may abstract resources and functions to connect the computing device 602 with other computing devices. The platform 626 may also serve to abstract scaling of resources to provide a corresponding level of scale to encountered demand for the resources 628 that are implemented via the platform 626. Accordingly, in an interconnected device embodiment, implementation of functionality described herein may be distributed throughout the system 600. For example, the functionality may be implemented in part on the computing device 602 as well as via the platform 626 that abstracts the functionality of the cloud 624.

In the discussions herein, various different embodiments are described. It is to be appreciated and understood that each embodiment described herein can be used on its own or in connection with one or more other embodiments described herein. Further aspects of the techniques discussed herein relate to one or more of the following embodiments.

A method comprising: configuring a first group of one or more processor cores in a device to run at a first frequency range; configuring a second group of one or more processor cores in the device to run at a second frequency range, the second frequency range including frequencies that are lower than frequencies in the first frequency range; determining an importance level of a first thread scheduled to be executed on the device, the importance level being one of multiple different importance levels; determining, based on the importance level of the first thread, whether the first thread is to be executed on the first group of one or more processor cores or the second group of one or more processor cores; and scheduling the first thread for execution on the determined group of one or more processor cores.

Alternatively or in addition to any of the above described methods, any one or combination of: the two importance levels comprising an important importance level and an unimportant importance level, the determining whether the first thread is to be executed on the first group of one or more processor cores or the second group of one or more processor cores comprising determining that the first thread is to be executed on the first group of one or more processor cores in response to determining that the importance level of the first thread is important, and determining that the first thread is to be executed on the second group of one or more processor cores in response to determining that the importance level of the second thread is unimportant; all of the processor cores in the first group of one or more processor cores and the second group of one or more processor cores comprising homogenous processor cores; the method further comprising dynamically adjusting, during operation of the device, which processor cores of the device are included in the first group of one or more processor cores and which processor cores of the device are included in the second group of one or more processor cores; the first group of one or more processor cores being associated with a first importance level of the multiple importance levels, and the second group of one or more processor cores being associated with a second importance level of the multiple importance levels, the dynamically adjusting comprising determining whether more concurrent threads having the first importance level exist in the device than threads having the second importance level, and upgrading at least one processor core in the second group of one or more processor cores to being one of the first group of one or more processor cores in response to more concurrent threads having the first importance level existing in the device than threads having the second importance level; the first group of one or more processor cores being associated with a first importance level of the multiple importance levels, and the second group of one or more processor cores being associated with a second importance level of the multiple importance levels, the dynamically adjusting comprising determining whether at least a threshold number of threads having the first importance level are scheduled on the second group of one or more processor cores, and upgrading at least one processor core in the second group of one or more processor cores to being one of the first group of one or more processor cores in response to at least the threshold number of threads having the first importance level being scheduled on the second group of one or more processor cores; the first group of one or more processor cores being associated with a first importance level of the multiple importance levels, and the second group of one or more processor cores being associated with a second importance level of the multiple importance levels, the dynamically adjusting comprising determining whether at least a threshold number of threads having the second importance level are scheduled on the first group of one or more processor cores, and downgrading at least one processor core in the first group of one or more processor cores to being one of the second group of one or more processor cores in response to at least the threshold number of threads having the second importance level being scheduled on the first group of one or more processor cores; the first group of one or more processor cores being associated with a first importance level of the multiple importance levels, and the second group of one or more processor cores being associated with a second importance level of the multiple importance levels, the determined group of one or more processor cores comprising the first group of one or more processor cores, the method further comprising determining whether there is at least one processor core in the first group of one or more processor cores available to execute the first thread, the scheduling the first thread for execution comprising scheduling the first thread for execution on the first group of one or more processor cores in response to there being at least one processor core in the first group of processor cores available to execute the first thread, and in response to determining that there is not at least one processor core in the first group of processor cores available to execute the first thread scheduling the first thread for execution on the second group of one or more processor cores, and configuring the processor core on which the first thread is scheduled for execution to run at a higher frequency range; the higher frequency range comprising the first frequency range; the frequencies in the second frequency range causing the second group of one or more processor cores to operate more efficiently as determined by performance per watt than the frequencies in the first frequency range cause the first group of one or more processor cores to operate.

A computing device comprising: multiple processor cores; and a computer-readable storage medium having stored thereon multiple instructions that, responsive to execution by the multiple processor cores, cause the multiple processor cores to perform operations comprising: configuring a first group of the multiple processor cores to run in accordance with a first energy performance preference, each processor core in the first group of processor cores being associated with a first importance level; configuring a second group of the multiple processor cores to run in accordance with a second energy performance preference, each processor core in the second group of processor cores being associated with a second importance level, the first energy performance preference indicating to be more aggressive at increasing frequency than the second energy performance preference; determining an importance level of a first thread scheduled to be executed on the computing device; and scheduling the first thread for execution on the one of the first group of multiple processor cores or the second group of multiple processor cores that is associated with the same importance level as the first thread.

Alternatively or in addition to any of the above described computing devices, any one or combination of: all of the multiple processor cores comprising a set of homogenous processor cores; the operations further comprising dynamically adjusting, during operation of the computing device, which of the multiple processor cores are included in the first group of the multiple processor cores and which of the multiple processor cores are included in the second group of the multiple processor cores; the dynamically adjusting comprising determining whether at least a threshold number of threads having the first importance level are waiting to be executed, and upgrading at least one processor core in the second group of the multiple processor cores to being one of the first group of the multiple processor cores in response to at least the threshold number of threads having the first importance level waiting to be executed.

A method comprising: configuring a first group of multiple processor cores to run in accordance with a first energy performance preference, each processor core in the first group of processor cores being associated with a first importance level; configuring a second group of the multiple processor cores to run in accordance with a second energy performance preference, each processor core in the second group of processor cores being associated with a second importance level, the first energy performance preference indicating to be more aggressive at increasing frequency than the second energy performance preference; determining an importance level of a first thread scheduled to be executed on the computing device; and scheduling the first thread for execution on the one of the first group of multiple processor cores or the second group of multiple processor cores that is associated with the same importance level as the first thread.

Alternatively or in addition to any of the above described methods, any one or combination of: all of the multiple processor cores comprising a set of homogenous processor cores; the method further comprising dynamically adjusting, during operation of the computing device, which of the multiple processor cores are included in the first group of the multiple processor cores and which of the multiple processor cores are included in the second group of the multiple processor cores; the dynamically adjusting comprising determining whether at least a threshold number of threads having the first importance level are waiting to be executed, and upgrading at least one processor core in the second group of the multiple processor cores to being one of the first group of the multiple processor cores in response to at least the threshold number of threads having the first importance level waiting to be executed.

A computing device comprising: a core configuration module configured to configure a first group of one or more processor cores in the computing device to run at a first frequency range, and configure a second group of one or more processor cores in the computing device to run at a second frequency range, the second frequency range including frequencies that are lower than frequencies in the first frequency range; a thread importance determination module configured to determine an importance level of a first thread scheduled to be executed on the computing device, the importance level being one of multiple different importance levels; and a scheduler configured to determine, based on the importance level of the first thread, whether the first thread is to be executed on the first group of one or more processor cores or the second group of one or more processor cores, and to schedule the first thread for execution on the determined group of one or more processor cores.

Alternatively or in addition to any of the above described computing devices, any one or combination of: the processor cores in the first group of one or more processor cores and the second group of one or more processor cores comprising a set of homogenous processor cores; the core partitioning module and the core configuration module being further configured to dynamically adjust, during operation of the computing device, which processor cores of the computing device are included in the first group of one or more processor cores and which processor cores of the computing device are included in the second group of one or more processor cores; the first group of one or more processor cores being associated with a first importance level of the multiple importance levels, and the second group of one or more processor cores being associated with a second importance level of the multiple importance levels, the dynamically adjusting comprising determining whether at least a threshold number of threads having the first importance level are scheduled on the second group of one or more processor cores, and upgrading at least one processor core in the second group of one or more processor cores to being one of the first group of one or more processor cores in response to at least the threshold number of threads having the first importance level being scheduled on the second group of one or more processor cores; the first group of one or more processor cores being associated with a first importance level of the multiple importance levels, and the second group of one or more processor cores being associated with a second importance level of the multiple importance levels, the dynamically adjusting comprising determining whether at least a threshold number of threads having the second importance level are scheduled on the first group of one or more processor cores, and downgrading at least one processor core in the first group of one or more processor cores to being one of the second group of one or more processor cores in response to at least the threshold number of threads having the second importance level being scheduled on the first group of one or more processor cores; the first group of the multiple processor cores being associated with a first importance level of the multiple importance levels, and the second group of one or more processor cores being associated with a second importance level of the multiple importance levels, the determined group of one or more processor cores comprising the first group of one or more processor cores, the scheduler being further configured to determine whether there is at least one processor core in the first group of one or more processor cores available to execute the first thread, schedule the first thread for execution on the first group of one or more processor cores in response to there being at least one processor core in the first group of processor cores available to execute the first thread, and in response to determining that there is not at least one processor core in the first group of processor cores available to execute the first thread schedule the first thread for execution on the second group of one or more processor cores, and configure the processor core on which the first thread is scheduled for execution to run at a the first frequency range.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
configuring a first group of one or more processor cores in a device to run at a first frequency range, the first group associated with a first importance level;
configuring a second group of one or more processor cores in the device to run at a second frequency range, the second frequency range including frequencies that are lower than frequencies in the first frequency range, the second group associated with a second importance level;
determining an importance level of a first thread scheduled to be executed on the device, the importance level being one of multiple different importance levels;
determining, based on the importance level of the first thread, whether the first thread is to be executed on the first group of one or more processor cores or the second group of one or more processor cores; and
scheduling the first thread for execution on the determined group of one or more processor cores;
dynamically adjusting, during operation of the device, which processor cores of the device are included in the first group of one or more processor cores and which processor cores of the device are included in the second group of one or more processor cores, the dynamically adjusting comprising:
comparing a number of threads having the first importance level with a number of threads having the second importance level; and
based on the comparing, adjusting at least one processor core in the second group of one or more processor cores to be in the first group of one or more processor cores.

2. The method as recited in claim 1, the importance levels comprising a first importance level and a second importance level, the determining whether the first thread is to be executed on the first group of one or more processor cores or the second group of one or more processor cores comprising determining that the first thread is to be executed on the first group of one or more processor cores in response to determining that the importance level of the first thread is the first importance level, and determining that the first thread is to be executed on the second group of one or more processor cores in response to determining that the importance level of the second thread is the second importance level.

3. The method as recited in claim 1, all of the processor cores in the first group of one or more processor cores and the second group of one or more processor cores comprising homogenous processor cores.

4. The method as recited in claim 1, further comprising dynamically adjusting, during operation of the device, which processor cores of the device are included in the first group of one or more processor cores and which processor cores of the device are included in the second group of one or more processor cores.

5. A method comprising:
configuring a first group of one or more processor cores in a device to run at a first frequency range, the first group associated with a first importance level;
configuring a second group of one or more processor cores in the device to run at a second frequency range, the second frequency range including frequencies that are lower than frequencies in the first frequency range, the second group associated with a second importance level;
determining an importance level of a first thread scheduled to be executed on the device, the importance level being one of multiple different importance levels;
determining, based on the importance level of the first thread, whether the first thread is to be executed on the first group of one or more processor cores or the second group of one or more processor cores;
scheduling the first thread for execution on the determined group of one or more processor cores; and
dynamically adjusting, during operation of the device, which processor cores of the device are included in the first group of one or more processor cores and which processor cores of the device are included in the second group of one or more processor cores, the dynamically adjusting comprising:
determining whether at least a threshold number of threads having the first importance level are scheduled on the second group of one or more processor cores, and based thereon, either (i) upgrading at least one processor core in the second group to be in the first group, or (ii) downgrading at least one core processor in the first group to be in the second group.

6. A method comprising:
configuring a first group of one or more processor cores in a device to run at a first frequency range, the first group associated with a first importance level;
configuring a second group of one or more processor cores in the device to run at a second frequency range, the second frequency range including frequencies that are lower than frequencies in the first frequency range, the second group associated with a second importance level;
determining an importance level of a first thread scheduled to be executed on the device, the importance level of the first thread being one of multiple different importance levels;
based on the importance level of the first thread and the importance level of the first group, determining that the first thread is to be executed on the first group of one or more processor cores, and based thereon scheduling the first thread to be executed on the first group;
determining that there is not at least one processor core in the first group available to execute the first thread; and
in response to determining that there is not at least one processor core in the first group available to execute the first thread:
scheduling the first thread for execution on the second group of one or more processor cores; and
configuring a processor core in the second group on which the first thread is scheduled for execution to run at a higher frequency range.

7. The method as recited in claim 6, the higher frequency range comprising the first frequency range.

8. The method as recited in claim 1, the frequencies in the second frequency range causing the second group of one or more processor cores to operate more efficiently as determined by performance per watt than the frequencies in the first frequency range cause the first group of one or more processor cores to operate.

9. A computing device comprising:
multiple processor cores; and
a computer-readable storage medium having stored thereon multiple instructions that, responsive to execution by the multiple processor cores, cause the multiple processor cores to perform operations comprising:
configuring a first group of the multiple processor cores to run in accordance with a first energy performance preference, each processor core in the first group of processor cores being associated with a first importance level;
configuring a second group of the multiple processor cores to run in accordance with a second energy performance preference, each processor core in the second group of processor cores being associated with a second importance level;
determining an importance level of a first thread scheduled, or being scheduled, to be executed on the computing device, and based thereon, scheduling the first thread for execution on the first group of multiple processor cores or on the second group of multiple processor cores;
dynamically adjusting, during operation of the computing device, which of the multiple processor cores are included in the first group of the multiple processor cores and which of the multiple processor cores are included in the second group of the multiple processor cores; and
determining whether at least a threshold number of threads having the first importance level are waiting to be executed, and based thereon, upgrading at least one processor core in the second group to be in the first group.

10. The computing device as recited in claim 9, all of the multiple processor cores comprising a set of homogenous processor cores.

11. A computing device comprising:
a core configuration module configured to configure a first group of one or more processor cores in the computing device to run at a first frequency, and to configure a second group of one or more processor cores in the computing device to run at a second frequency, the second frequency lower than the first frequency;
a thread importance determination module configured to determine an importance level of a first thread scheduled or being scheduled to be executed on the computing device, the importance level being one of multiple different importance levels, wherein the first group is associated with a first importance level and the second group is associated with a second importance level; and
a scheduler configured to determine, based on the importance level of the first thread and the importance level associated with the first group, that the first thread is to be executed on the first group, and to schedule the first thread for execution on the determined first group;
the scheduler further configured to:
determine that there is not at least one processor core in the determined first group available to execute the first thread, and based thereon:
schedule the first thread for execution on the second group; and
configure a processor core in the second group on which the first thread is scheduled for execution to run at the first frequency.

12. The computing device as recited in claim 11, the processor cores in the first group of one or more processor cores and the second group of one or more processor cores comprising a set of homogenous processor cores.

13. The computing device as recited in claim 11, the core partitioning module and the core configuration module being further configured to dynamically adjust, during operation of the computing device, which processor cores of the computing device are included in the first group of one or more processor cores and which processor cores of the computing device are included in the second group of one or more processor cores.

14. The computing device as recited in claim 13, the first group of one or more processor cores being associated with a first importance level of the multiple importance levels, and the second group of one or more processor cores being associated with a second importance level of the multiple importance levels, the dynamically adjusting comprising:
   determining whether at least a threshold number of threads having the first importance level are scheduled on the second group of one or more processor cores; and
   upgrading at least one processor core in the second group of one or more processor cores to being one of the first group of one or more processor cores in response to at least the threshold number of threads having the first importance level being scheduled on the second group of one or more processor cores.

15. The computing device as recited in claim 13, the first group of one or more processor cores being associated with a first importance level of the multiple importance levels, and the second group of one or more processor cores being associated with a second importance level of the multiple importance levels, the dynamically adjusting comprising:
   determining whether at least a threshold number of threads having the second importance level are scheduled on the first group of one or more processor cores; and
   downgrading at least one processor core in the first group of one or more processor cores to being one of the second group of one or more processor cores in response to at least the threshold number of threads having the second importance level being scheduled on the first group of one or more processor cores.

* * * * *